United States Patent [19]
Woolley

[11] Patent Number: 5,738,331
[45] Date of Patent: Apr. 14, 1998

[54] AIRCRAFT CROSSWIND CONTROL APPARATUS

[76] Inventor: Paul A. Woolley, 706 Collier Dr., Spearman, Tex. 79081

[21] Appl. No.: 327,437

[22] Filed: Oct. 21, 1994

[51] Int. Cl.⁶ .............................. B64C 5/08; B64C 5/10; B64C 13/16
[52] U.S. Cl. ........................ 244/82; 244/91; 244/103 W
[58] Field of Search ........................ 294/82, 91, 103 W

[56] References Cited

U.S. PATENT DOCUMENTS

| | | |
|---|---|---|
| 1,287,297 | 12/1918 | Hall ............................................. 244/91 |
| 1,803,655 | 5/1931 | Salisbury et al. ........................... 244/82 |
| 1,808,344 | 6/1931 | Depue ........................................ 244/91 |
| 1,844,186 | 2/1932 | Short . |
| 1,851,797 | 3/1932 | Almeida .................................... 244/82 |
| 2,007,964 | 7/1935 | Crane ........................................ 244/82 |
| 2,172,289 | 9/1939 | Munk . |
| 2,390,939 | 12/1945 | Huff . |
| 2,406,374 | 8/1946 | Holt . |
| 2,433,649 | 12/1947 | Clevenger et al. . |
| 2,474,585 | 6/1949 | Lloyd . |
| 3,361,392 | 1/1968 | Doniger et al. . |
| 3,463,419 | 8/1969 | Rashidian . |
| 3,469,807 | 9/1969 | Morris, Jr. . |
| 3,912,202 | 10/1975 | Jenkins . |
| 4,457,479 | 7/1984 | Daude . |
| 5,069,402 | 12/1991 | Wortman ................................... 244/91 |

FOREIGN PATENT DOCUMENTS

| | | | |
|---|---|---|---|
| 0188998 | 7/1986 | European Pat. Off. ................ 244/91 |
| 151153 | 9/1920 | United Kingdom .............. 244/103 W |

*Primary Examiner*—Andres Kashnikow
*Assistant Examiner*—Virna Lissi Mojica
*Attorney, Agent, or Firm*—Michael I. Kroll

[57] ABSTRACT

The present invention relates to a control system for an aircraft to compensate for crosswinds on landings. In one embodiment, the control system includes two mutually identical control surfaces having common end points, respectively; and an actuator to move completely the two mutually identical control surfaces, as needed to compensate for the crosswinds on landing.

4 Claims, 9 Drawing Sheets

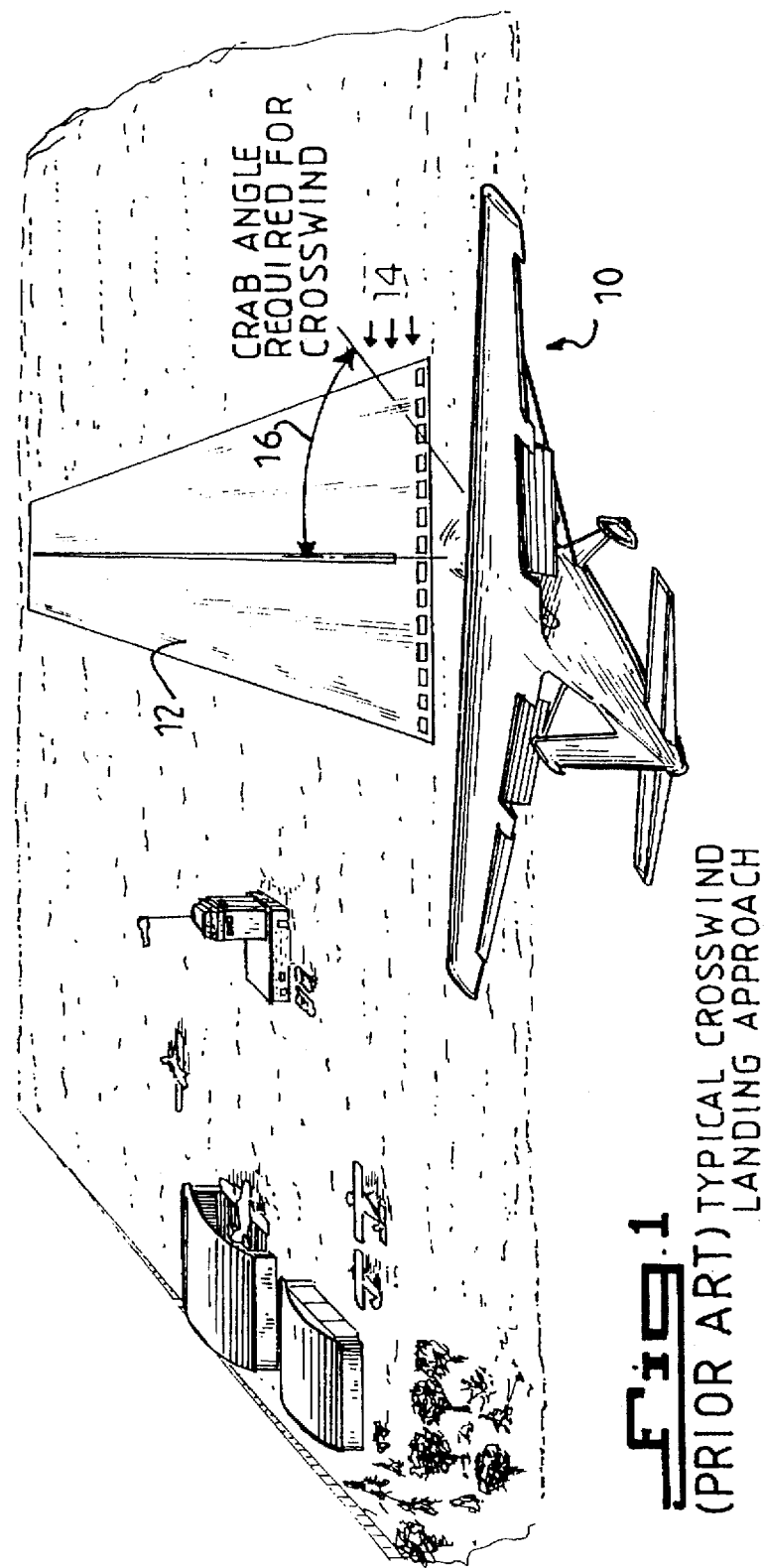

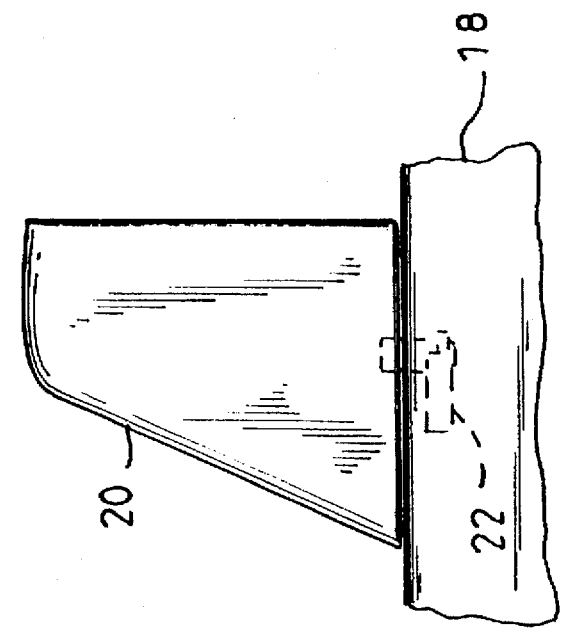
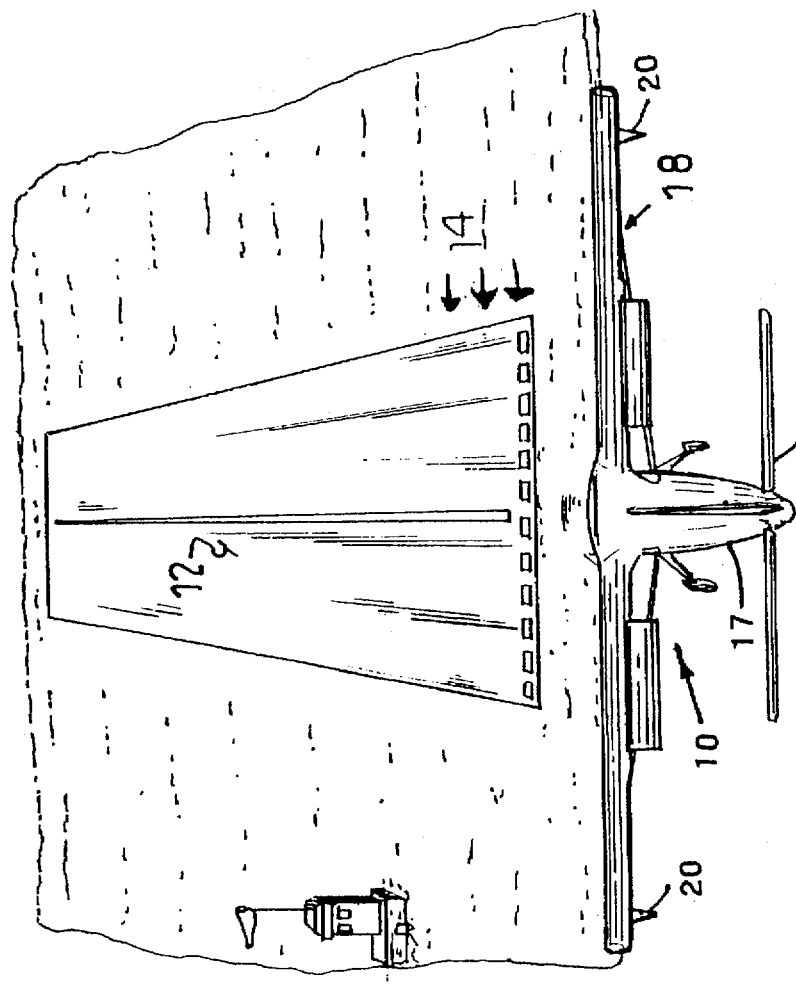

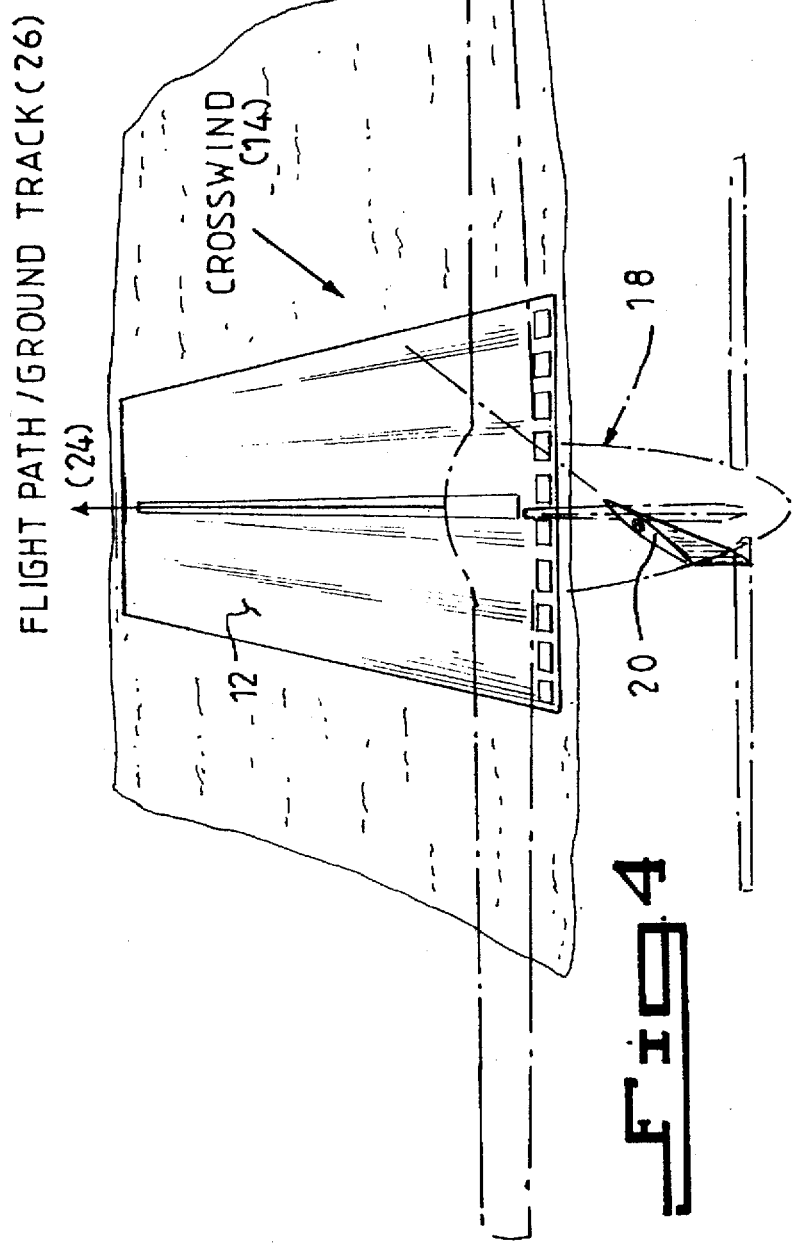

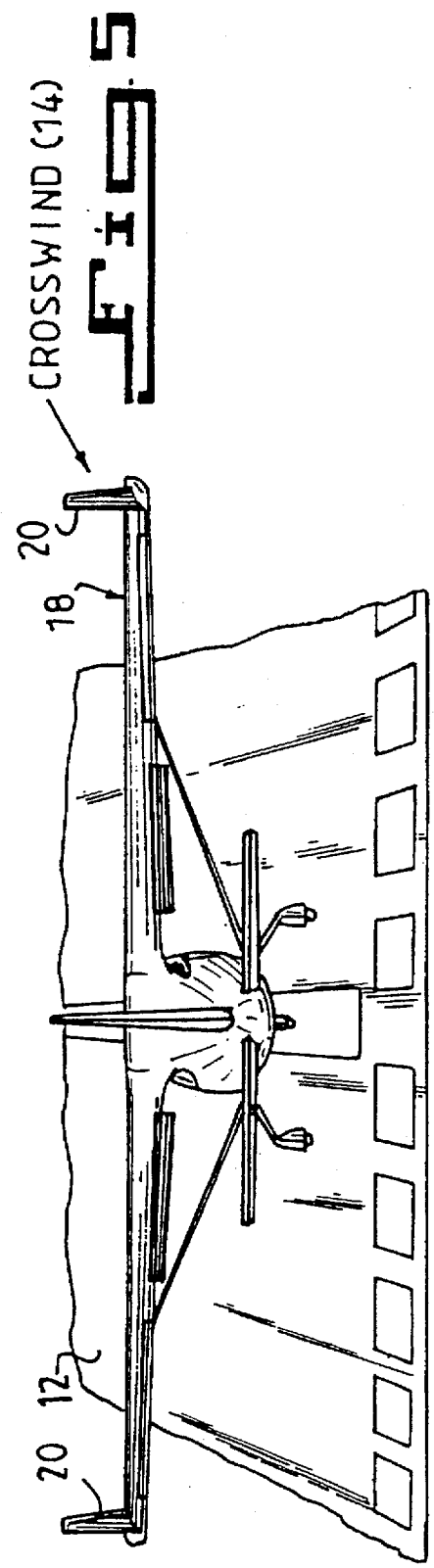

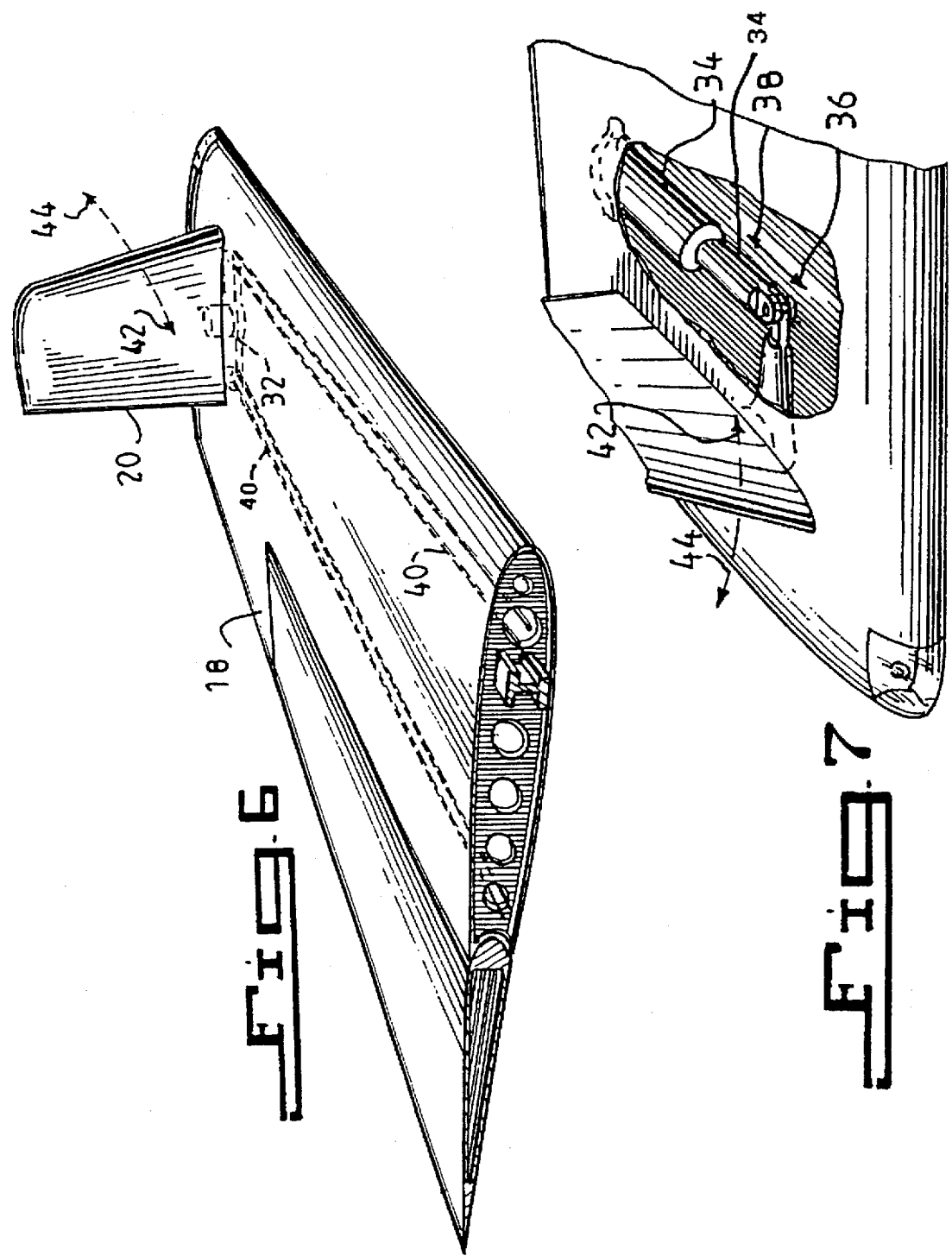

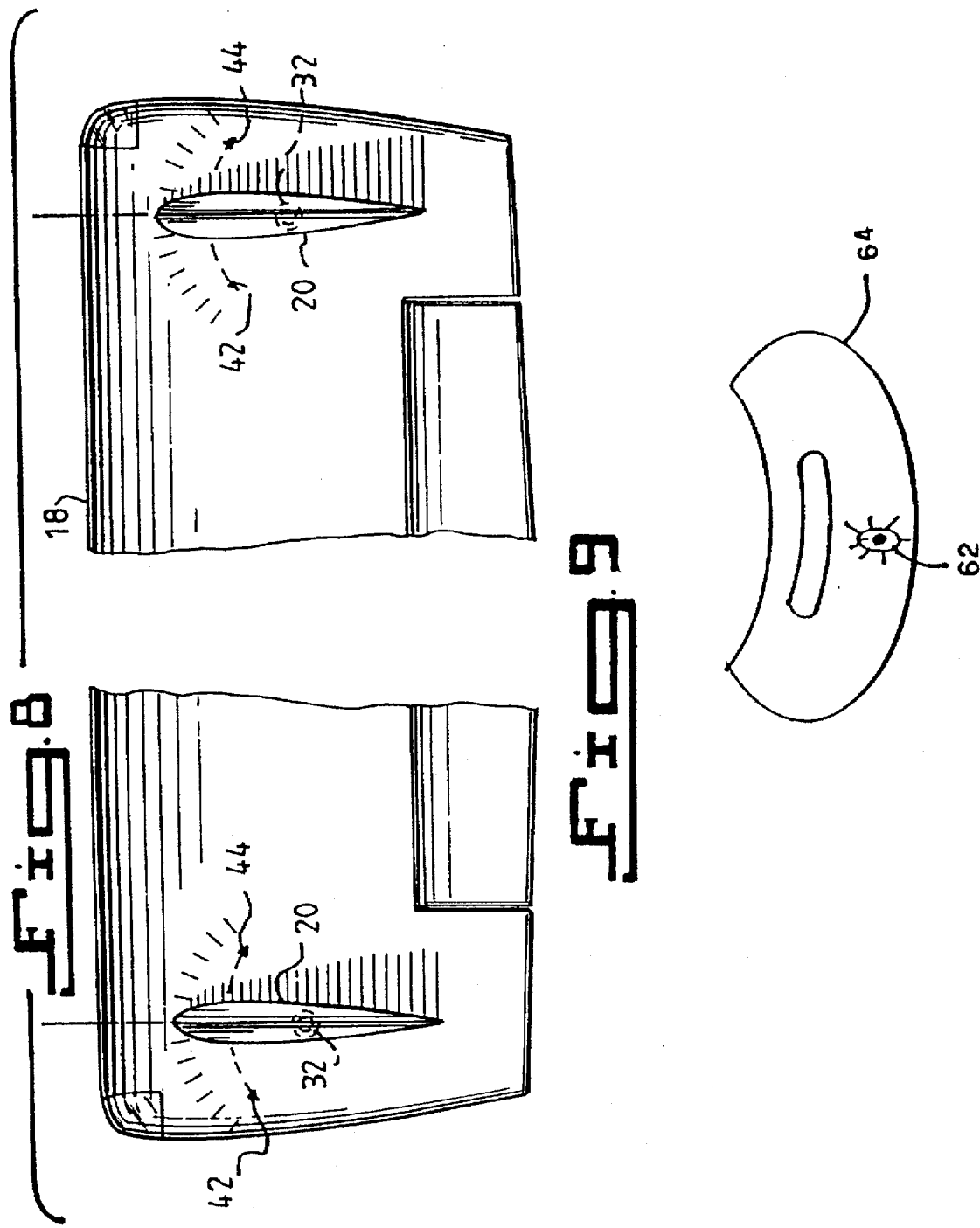

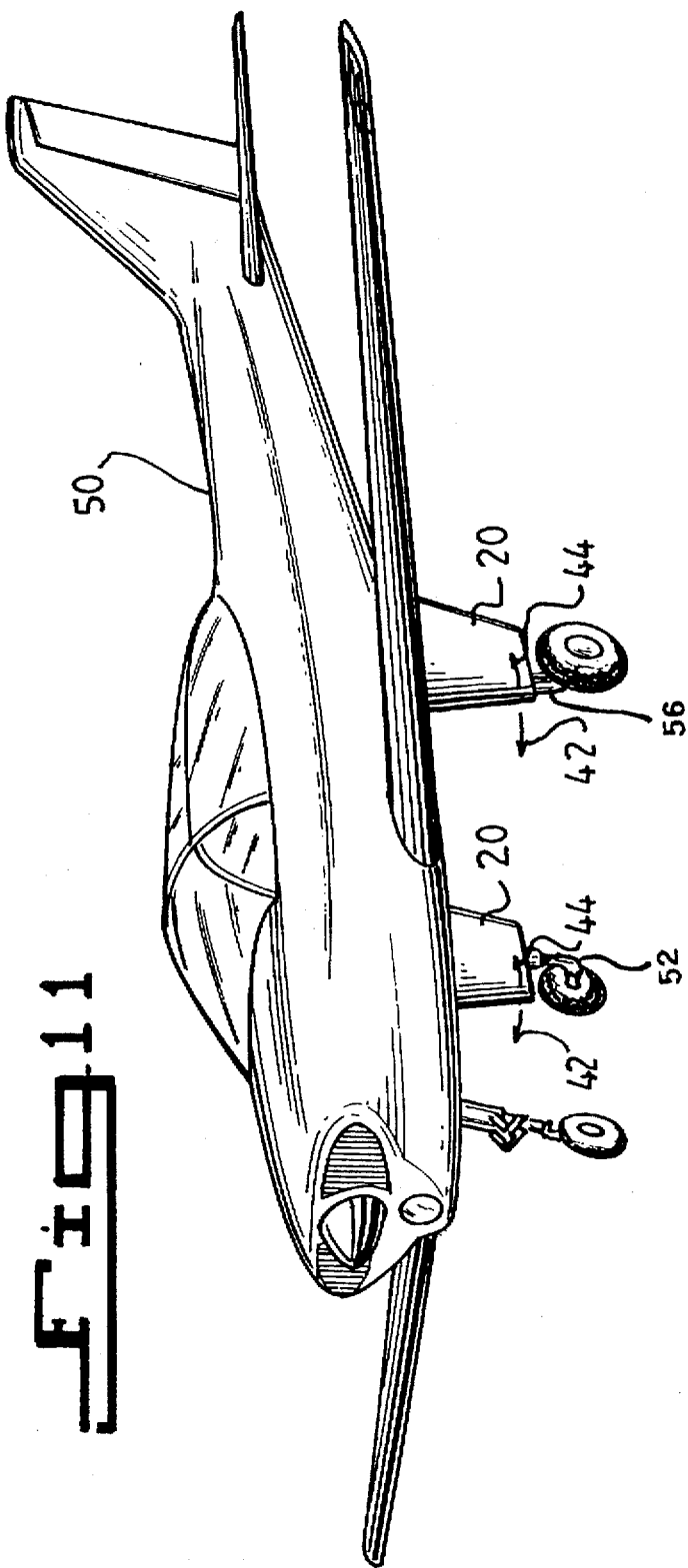

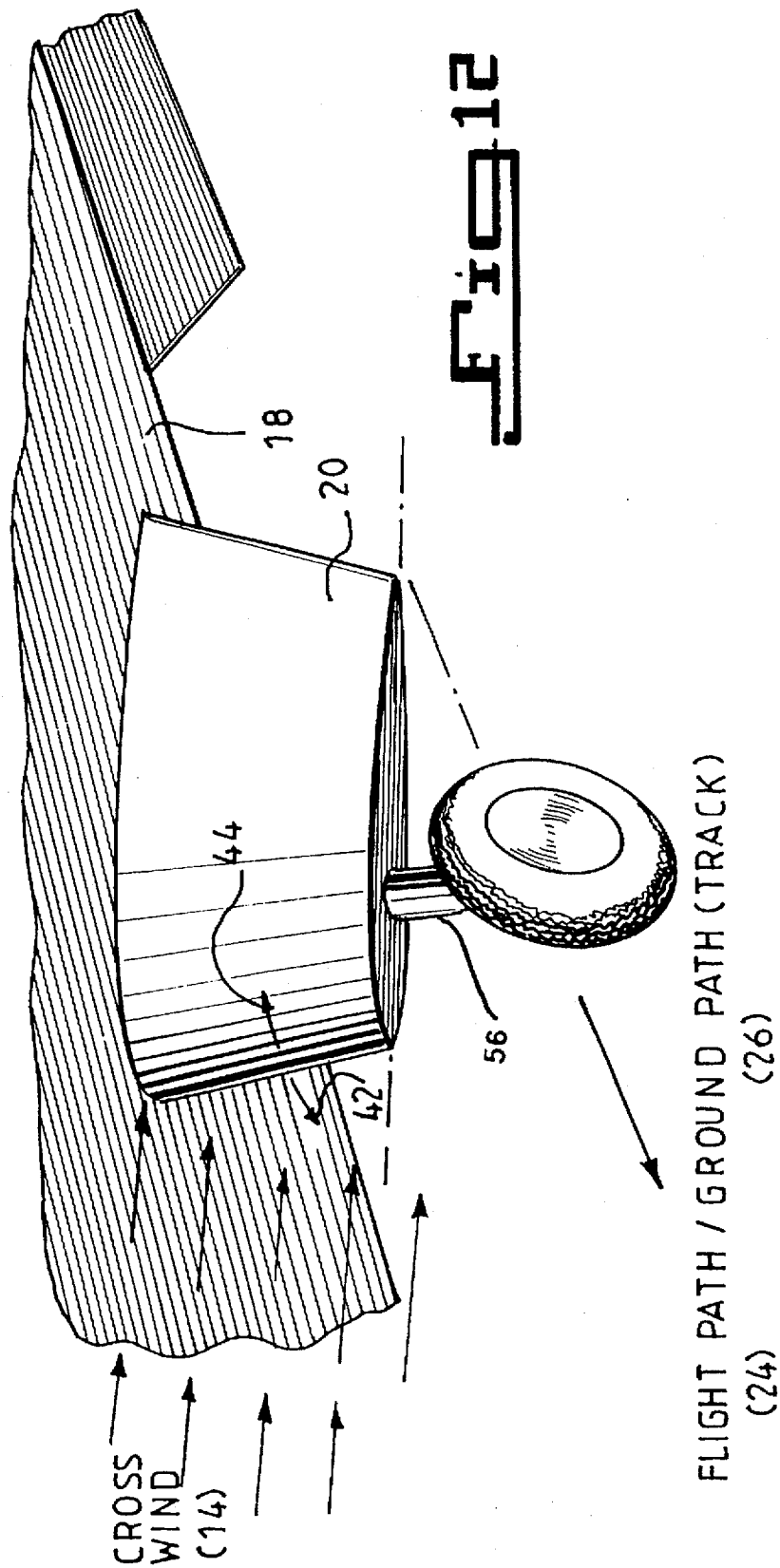

AIRCRAFT CROSSWIND CONTROL APPARATUS

BACKGROUND OF THE INVENTION

1. Field of the Invention

The present invention relates to an aircraft control apparatus.

More particularly, the present invention relates to an aircraft control apparatus for insuring that the aircraft will make a straight-in landing with the wings level.

2. Description of the Prior Art

Numerous innovations for aircraft crosswind control apparatus have been provided in the prior art that are adapted to be used. Even though these innovations may be suitable for the specific individual purposes to which they address, they would not be suitable for the purposes of the present invention as hereinafter described.

Pat. No. 4,284,254 teaches an actuator. An actuator is used to move something whether it be a control surface, a seat or anything else. It does not, by itself, move the aircraft. It is not a system for a control surface.

Pat. No. 4,146,200 teaches a control surface pivotally mounted on the trailing edge of the wings, which are horizontal. A horizontal control surface can not move the aircraft from side to side. It therefore is unable to cause the aircraft to fly into a crosswind in a manner which the aircraft flies straight with ground track.

Pat. No. 2,987,277 teaches another horizontal control surface which is intended to aid in a roll situation along its longitudinal axis. Here again the horizontal control surface will not move the aircraft from right to left or left to right while keeping the wings level.

Pat. No. 014,481 teaches a towed craft pulled by an airplane. It has both vertical and horizontal stabilizers with drag type controls. As an airplane is not towed in, as an automobile which has stalled, this type of control will not correct or even aid in a crosswind landing. This type will have less effect than the rudder on a normal aircraft.

Pat. No. 3,469,807 teaches an aircraft which uses flaps and ailerons together. As the aircraft is going along with the flaps and ailerons down, the pilot elects to raise the right flap and aileron up a few degrees. As the control surfaces go up they cause less drag on the right side. So the craft simply would begin a nose left rotation of yaw. To control this yaw condition a panel opens on the wing tip, which increases the drag to the amount of the left side. Therefore the aircraft goes straight, but rolls on the longitudinal axis. This system helps control yaw, but will not have nay effect against drift caused by a crosswind.

SUMMARY OF THE INVENTION

Accordingly, it is an object of the present invention to provide an aircraft control apparatus.

More particularly, it is an object of the present invention to provide an aircraft crosswind control apparatus that avoids the disadvantages of the prior art.

The present invention reduces the stress and side load on the air frame and landing gear which extends the serviceable life of both and the tires.

The present invention solves the problem of guesswork of when to change rudder at proper crab and altitude to make a safe landing.

The present invention makes a potentially dangerous landing a very manageable one.

The present invention is a safety of flight item in crosswind and a welcome aid in normal flight.

The aircraft crosswind control apparatus of the present invention includes one or more vertical control surfaces mounted on the fuselage or wings that are controlled from the cockpit. By rotating these control surfaces right or left, one will be able to equalize the drift effect of a crosswind. Therefore enabling a pilot to make a straight in approach with wings level and no crab angle.

The size required will be different for each aircraft due to physical size and landing speed.

This is not a spin off of the winglets used on some aircraft. Winglets cause more drift as they are fixed surfaces. But by being as they are they may create more lift and maybe a slight increase in airspeed.

In keeping with these objects, and with others which will become apparent hereinafter, one feature of the present invention resides, briefly stated, in a control system for an aircraft to compensate for crosswinds on landings, including two mutually identical control surfaces having common end points, respectively; and an actuator to move completely the two mutually identical control surfaces, as needed to compensate for the crosswinds on landing.

In accordance with another feature of the present invention, each of the two mutually identical control surfaces are convex.

Another feature of the present invention is that the control surfaces are disposed on wingtips extending upwardly.

Another feature of the present invention is that the control surfaces are disposed on the wingtips extending downwardly.

Yet another feature of the present invention is that the control surfaces are disposed on the center of the underbelly of a high wing aircraft.

Still another feature of the present invention is that the control surfaces are disposed on the main landing struts of a low wing aircraft.

Still yet another feature of the present invention is that the actuator contains a belcrank, a pair of pulleys and wire.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawings.

BRIEF DESCRIPTION OF THE DRAWINGS

FIG. 1 is a perspective view of an aircraft of the prior art experiencing a crab during landing;

FIG. 2 is a perspective view of an aircraft of the present invention experiencing a straight landing and showing the control surfaces located under the wings;

FIG. 3 is a side view of the aircraft crosswind control apparatus of the present invention;

FIG. 4 is a perspective view of the aircraft crosswind control apparatus of the present invention attempting to correct for a crosswind;

FIG. 5 is a perspective view of the aircraft crosswind control apparatus of the present invention corrected from a crosswind;

FIG. 6 is a perspective view of the aircraft crosswind control apparatus mounted to a wing;

FIG. 7 is a perspective view of with parts cut away of the actuator of the aircraft crosswind control apparatus of the present invention;

FIG. 8 is a plan view of the aircraft crosswind control apparatus of the present invention showing their corrective range on a wing.

FIG. 9 is an illustrative view of the contral switch mounted on the control wheel of the aircraft.

FIG. 11 is a perspective view of the aircraft crosswind control apparatus of the present invention being used on the landing struts of a low wing airplane.

FIG. 12 is a perspective view of the aircraft crosswind control apparatus of the present invention interfacing with a crosswind.

DETAILED DESCRIPTION OF THE PREFERRED EMBODIMENTS

Figure 10:
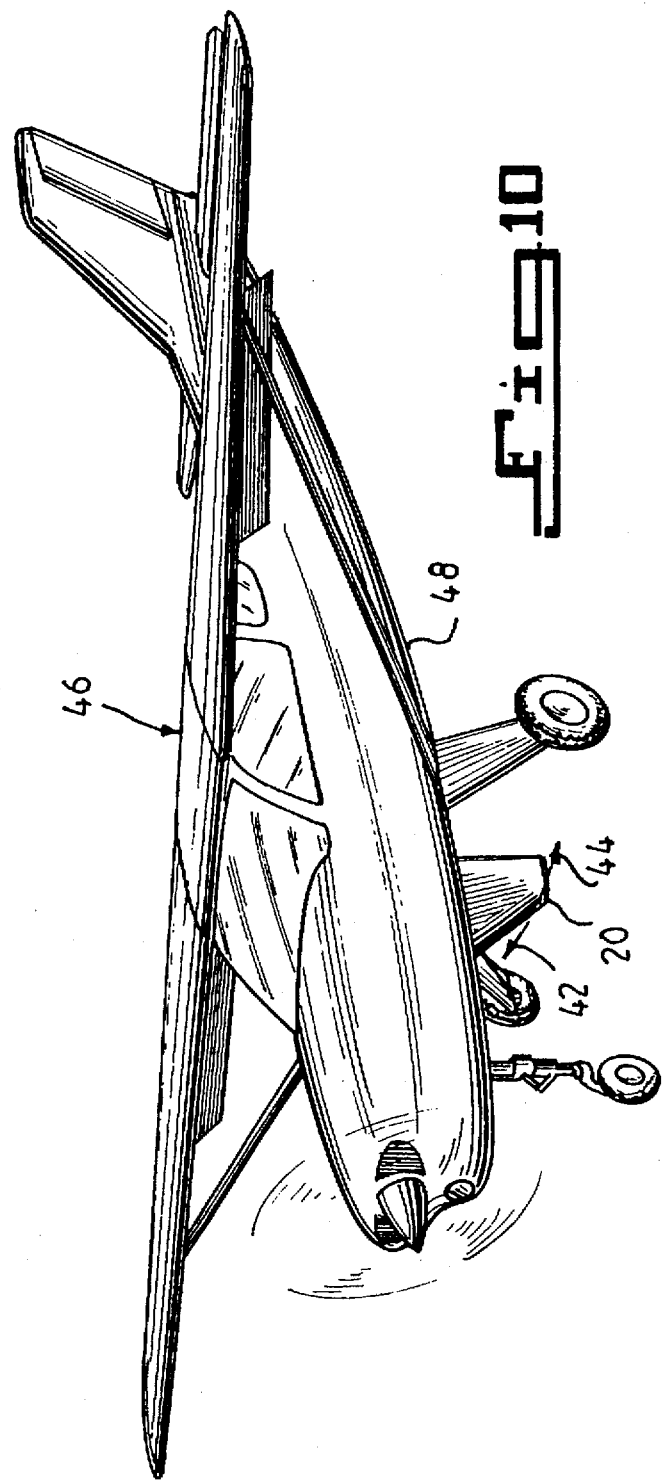
FIG. 10 is a perspective view of the aircraft crosswind control apparatus of the present invention being used on the underbody of a high wing airplane.

The aircraft crosswind control apparatus of the present invention will let the pilot make an approach, in a crosswind with his ground track and longitudinal axis in the same direction. The present invention will make it possible for the pilot to eliminate the side drift of the aircraft due to crosswind. This apparatus would have a short vertically mounted control on each wing tip. This is not a fixed winglet as on some aircraft nor a fixed fin with a movable surface such as the rudder and or vertical stabilizer. It is a totally movable control. If the wind is blowing from the right, the pilot simply turns the control surfaces to the right to neutralize the drift, and the rudder is still used for directional control.

The aircraft crosswind control apparatus of the present invention is an additional control surface which is controlled by the pilot or co-pilot. It can be mounted in many different places on the aircraft. For example, it can be mounted on the stationary part of the main gear strut, which would serve as a fairing as well as a control surface.

On some aircraft, a single apparatus might work better as this would most likely be mounted on the bottom side between the main gear, while other's will go for the two apparatus' on the wing tips. This would serve as an air stop for air going off the wing tip which would give the aircraft more lift, less boundary layer separation and possibly make it a little faster, besides the crosswind control. This control surface would be mounted on bearings and controlled by cable or rods or electrically by a switch mounted on the control wheel or by the use of a servo it could be used on all aircraft, with the most help going to lighter aircraft as they usually have a slower landing speed.

Crosswinds are very dangerous to any landing aircraft. That is why the aircraft crosswind control apparatus of the present invention is a safety apparatus. Also, the aircraft crosswind control apparatus of the present invention is an important life saver for the air frame as it reduces the side load on the landing gear during a crosswind and this reduces metal fatigue which makes the plane stronger and safer. The present invention would take the guesswork out of crosswind landings. Now a pilot has to guess when to move the rudder to align the plane with the runway, try to keep the wings level or try to keep the wind from turning the aircraft over and destroy the plane. With the aircraft crosswind control apparatus of the present invention, he simply rotates the control to the right or left as needed and makes a straight-in approach with the wings level. The more crosswind the more the pilot turns the aircraft crosswind control apparatus of the present invention to compensate for it.

The aircraft crosswind control apparatus of the present invention is one or two vertical mounted control surfaces which can be moved to the right or left in unison by approximately 45° or less to move the aircraft into the crosswind at an equal amount and make a straight-in landing.

Reference is now made to the figures where like numbers indicate like parts.

As seen in FIG. 1, a conventional aircraft 10 is attempting to land on runway 12 during a crosswind 14. The aircraft must exercise a crab angle 16 in order to compensate for the crosswind 14.

As seen in FIG. 2, an aircraft 10 with downwardly extending aircraft crosswind control apparatus 20 of the present invention built in can land on runway 12 during a crosswind 14. The aircraft need not exercise a crab angle in order to compensate for the crosswind.

Aircraft 10 comprises a fuselage 17 with a pair of laterally extending fixed wings 18 and a rudder assembly 19 at the rear of fuselage 17.

Each crosswind apparatus 20 comprises a vertically extending air foil shaped member symmetrical on both sides with two identical convex surfaces as illustrated in FIG. 8.

Referring to FIG. 3, the actuating means 22 is shown in broken lines where the aircraft crosswind control apparatus 20 of the present invention joins the wing 18. Heading into the crosswind 14, aircraft crosswind control apparatus 20 of the present invention will cause the aircraft 10 (shown in phantom in FIG. 4) to try to and successfully move into the crosswind 14. When the flight path 24 is colinear with the ground track the control apparatus 20 is left in that position to land. However, changes can be made at any time, as changes in wind direction or speed occur).

Aircraft crosswind control apparatus 20 of the present invention mounted as winglets, extending upwardly, as shown in FIGS. 5 and 8, also stop air slip off the tips which would be caused by the boundary layer separation and ultimate vortices. Both crosswind control apparatus 20 are rotated in unison to effect the purposes of this invention.

A more detailed figure is FIG. 7, where the aircraft crosswind control apparatus 20 of the present invention is shown movably mounted on an aircraft wing 18 with an actuator 32 operated by cables 40.

In FIG. 7 is shown an alternative actuation assembly consisting of hydraulic dampner 34 whose piston 34a moves in the directions of arrows 36 and 38 while the aircraft crosswind control apparatus 20 of the present invention moves in the directions of arrows 42 and 44.

As seen in FIG. 9, the pilot may be provided with a switch 62 mounted on a control wheel 64 of the aircraft. Switch 62 would be connected mechanically, hydraulically or electrically in conventional fashion to rotate control apparatus 20 simultaneously and in unison to effect the purposes of this invention.

In FIG. 10, a high wing aircraft 46 contains the aircraft crosswind control apparatus 20 of the present invention which is mounted as a single control on the center of the underbelly 48 of the high wing aircraft 46 along the central axis of the fuselage.

In FIG. 11, the aircraft crosswind control apparatus 20 of the present invention are mounted to the main gear struts 52, 56 of the low wing aircraft 50.

FIG. 12 shows the aircraft crosswind control apparatus 20 of the present invention in more detail as mounted on strut 56 on a low wing aircraft 50.

When apparatus 20 is mounted on landing gear struts of the aircraft as seen in FIGS. 11 and 12, it is understood that only apparatus 20 will rotate, not the wheels.

It will be understood that each of the elements described above, or two or more together, may also find a useful application in other types of constructions differing from the type described above.

While the invention has been illustrated and described, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. The method of landing a fixed wing aircraft having a fuselage with a wing member extending laterally therefrom and a rudder assembly mounted at the rear of said fuselage, the method comprising the steps of:

in addition to said rudder assembly mounted at the rear of said fuselage mounting on the outside of said wing member a pair of identical vertically extending airfoil shaped members on opposite sides of and equidistant from said fuselage for rotational movement of the whole members about a vertical axis located between the leading and trailing edges of said members;

remotely actuating while landing said aircraft in a crosswind said members to rotate about said axes in unison to an angular position which maintains said aircraft in a straight-in approach with the wing member level.

2. The method of claim 1 in which said members are disposed on wingtips.

3. The method of claim 2 in which said members extend vertically upwardly.

4. The method of claim 2 in which said members extend vertically downwardly.

* * * * *